United States Patent [19]

Brunner et al.

[11] 4,245,811
[45] Jan. 20, 1981

[54] PRESS MOULD HALF, MORE ESPECIALLY FOR PRODUCING RECORDS

[75] Inventors: Winfried Brunner, Unterhaching; Helmut Dederra, Ottobrunn, both of Fed. Rep. of Germany

[73] Assignee: Messerschmitt-Bölkow-Blohm Gesellschaft mit beschränkter Haftung, Munich, Fed. Rep. of Germany

[21] Appl. No.: 44,065

[22] Filed: May 31, 1979

[30] Foreign Application Priority Data

Jun. 6, 1978 [DE] Fed. Rep. of Germany ....... 2824751
May 16, 1979 [DE] Fed. Rep. of Germany ....... 2919683

[51] Int. Cl.² .................. B29D 17/00; B29C 17/00
[52] U.S. Cl. .................................. 249/80; 425/410; 249/79
[58] Field of Search .............. 249/80, 79; 425/810

[56] References Cited

U.S. PATENT DOCUMENTS

| 15,608 | 5/1923 | Burroughs | 425/810 |
| 1,307,812 | 6/1919 | Errickson | 425/810 |
| 1,504,422 | 8/1924 | Bishop | 425/810 |
| 1,582,704 | 4/1926 | Sylvester et al. | 425/810 |
| 2,501,823 | 3/1950 | Leedorm | 425/810 |
| 3,830,459 | 8/1974 | Strausfeld | 425/810 |
| 3,918,875 | 11/1975 | Phillipson et al. | 425/810 |
| 4,018,552 | 4/1977 | Prast et al. | 425/810 |

Primary Examiner—J. Howard Flint, Jr.
Attorney, Agent, or Firm—Toren, McGeady and Stanger

[57] ABSTRACT

A press mold half for producing records comprises a mould half having a pressing surface thereon, and a channel system beneath the surface for conducting heating and cooling fluids in indirect heat transfer relationship with the surface. The channel system includes spaced apart inflow and outflow fluid collecting chambers, and a number of channels extending over given paths between the chambers, the overall cross section of the channels in regions adjacent the outflow collecting chamber is less than the smallest overall cross section of the channels over the remainder of their paths, thereby resulting in uniform heating and cooling of the material being pressed.

16 Claims, 8 Drawing Figures

PRESS MOULD HALF, MORE ESPECIALLY FOR PRODUCING RECORDS

The invention relates to a press mould half, more especially for producing records, having a channel system, for heating and/or cooling media, which is formed underneath the pressing surface of the press mould half and which is arranged in uniformly-distributed manner over the pressing surface and which is provided with an inflow collecting chamber and an outflow collecting chamber.

It has become apparent that records pressed with known press mould halves have a tendency, after the cooling down of the pressing composition, as a result of non-uniform heating and/or cooling of the same, to warp in such a way that, when being played on a record-player, they do not rest flat on the turntable thereof. This may not only impair the playback quality of the record, but also lead to a limitation of its useful life.

The task of the invention is therefore to provide a press mould half in which the heating of the pressing composition by a heating medium and/or the cooling of the pressing composition by a cooling medium is effected rapidly and uniformly over the entire pressing surface, so that records which are produced by doing this have satisfactory quality.

In accordance with the invention, this problem is solved in that the channel system is formed by channels which extend respectively from the inflow collecting chamber towards the outflow collecting chamber, the overall cross-section of which is reduced directly prior to their opening out into the outflow collecting chamber, with respect to the smallest overall cross-section of the channels in their course between the inflow collecting chamber and the outflow collecting chamber. What is intended to be achieved by this measure is that the heating and/or cooling media or fluids which flow into the press mould are dammed up at the end of the channels, that is to say shortly prior to the opening of the channels into the outflow collecting chamber. The result of this is a rapid and homogeneous filling of the press mould half with heating and/or cooling medium and thus the desired rapid and uniform heating and/or cooling of the same.

Apart from the known spiral arrangement of the channels between the inflow collecting chamber and the outflow collecting chamber, it proved to be advantageous to design the channels between the inflow and outflow collecting chamber extending in the radial direction or in spoke-shaped manner in the press mould, because in this way short channels and an arrangement of the channels which is distributed relatively uniformly over the pressing surface of the press mould half emerge.

By providing further, preferably three, distribution annular chambers between the inflow annular chamber and the outflow annular chamber, so to speak stages are provided, within which the number of channels from the centre of the press mould towards the outer edge thereof can be increased stepwise, for example be doubled, in accordance with the periphery which becomes greater in the radial direction outwardly. It proves to be particularly advantageous—considered in the radial direction outwardly—to form 24 channels in the first stage, 48 channels in the second stage and 96 channels in the third stage in the press mould half, so that these can be charged practically uniformly with heating and/or cooling medium in the region which is important for the pressing of a record.

Further features, details and advantages will become apparent from the following description of preferred embodiments of the object of the invention and from the accompanying drawings, in which.

Figure 1:
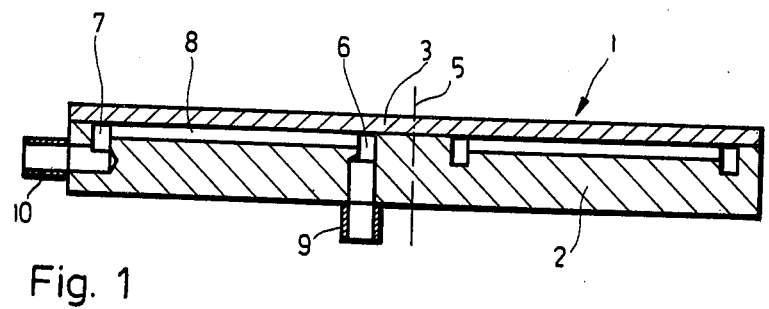
FIG. 1 shows a cross-section through a press mould half in accordance with the invention, along the line of section I—I in FIG. 2, with a base plate and a cover plate which has a pressing surface.

FIG. 1 shows a press mould half 1 in accordance with the invention with a base plate 2 and a cover plate 3 which is connected to this. The cover plate 3 can be mounted on the base plate 2 for example in accordance with one of the methods described in German Patent Application No. P 27 21 637.1.

Figure 2:
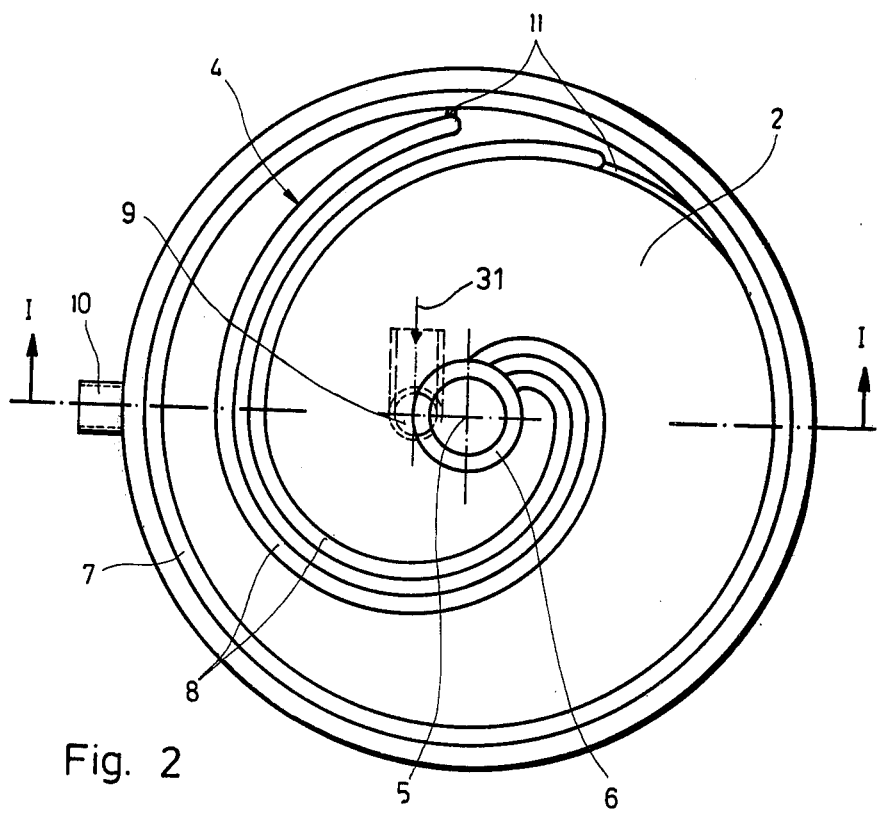
FIG. 2 shows a top plan view of the base plate in accordance with FIG. 1, into which a system of spirally-extending channels is worked.

As revealed by FIG. 2, the base plate 2 is provided, on the side facing the cover plate 3, with a channel system 4 which, in this case, has a radially internal inflow collecting chamber 6 which is designed as an annular chamber which is arranged concentrically to the centre 5 of the press mould half 1, and a radially external outflow collecting chamber 7 which is similarly designed as an annular chamber which is concentric to the centre 5, with channels 8 which are arranged spirally therebetween, preferably in the manner of an archimedes spiral.

This type of arrangement of the channels 8 means that the latter have at any point of the base plate 2, in other words irrespective of the respective radial distance from the centre 5 of the same, the same spacing from one another. Thus the pressing surface of the press mould half 1 can in operation, as desired, be heated up and/or cooled down uniformly in an optimum manner.

The spirally-designed channels 8 have, at their rear end in the direction of flow of the heating and/or cooling media, respectively, a constriction 11, before they open out into the outflow collecting chamber 7. In the embodiment shown here, the flow of the heating and/or cooling media is directed from the centre 5 towards the outer edge of the press mould half 1. It could, of course, also be effected in the reverse direction.

The constriction 11 brings about the damming, mentioned at the beginning hereof, of the heating and/or cooling media, which is in turn the cause of a rapid and uniform filling of the channels 8 with heating and/or cooling media or a uniform distribution of quantity of flow in the channels 8.

Figure 3:
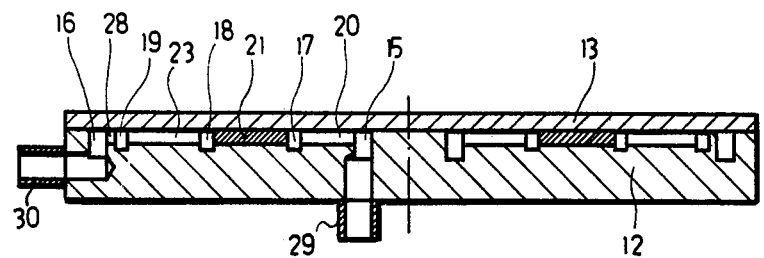
FIG. 3 shows a cross-section through a further embodiment of the press mould half in accordance with the invention, along the line of section III—III in FIG. 4, with a base plate and a cover plate which has a pressing surface.
Figure 4:
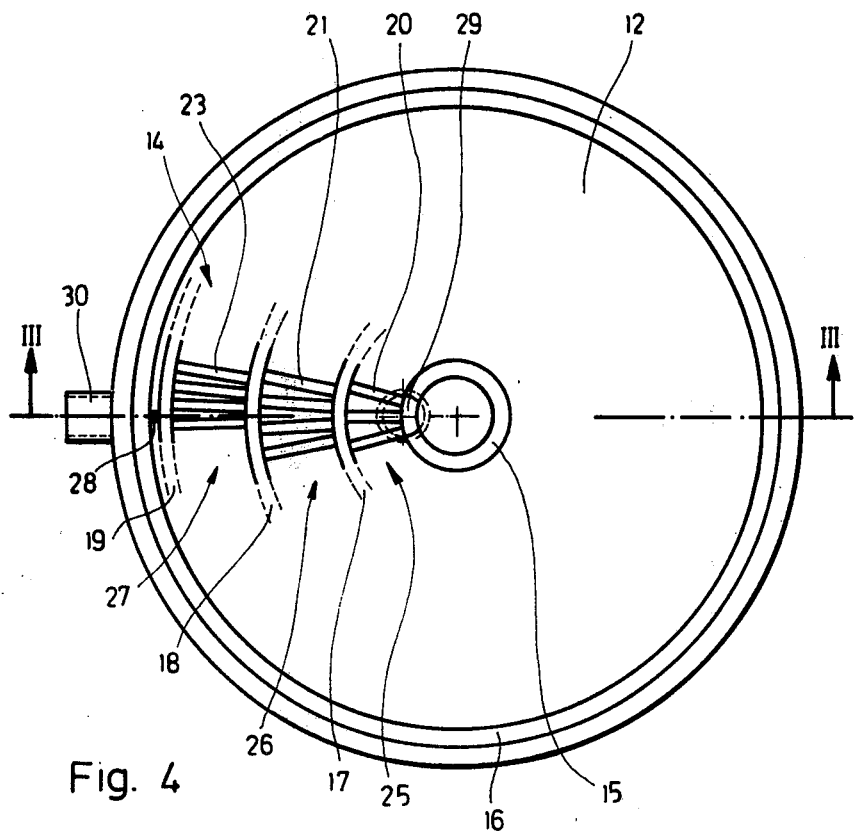
FIG. 4 shows a top plan view of the base plate in accordance with FIG. 3, into which a system of channels extending in spoke-shaped manner is worked.

Shown in FIGS. 3 and 4 is a base plate 12 which is provided, on the side facing the cover plate 13, with a channel system 14. This has, in this case, an inner annular chamber 15, an outer annular chamber 16, as well as a first, second and third distribution annular chamber 17, 18, and 19.

Formed between the inner annular chamber 15 and the first distribution annular chamber 17 are channels 20 which preferably extend in spoke-shaped manner and the number of which in this case amounts, for example, to 24. These 24 channels 20 are arranged in a uniformly-distributed manner over the extent of the base plate 12 (stage 25).

Formed between the first distribution annular chamber 17 and the second distribution annular chamber 18 are channels 21 which preferably similarly extend in spoke-shaped manner and whose entries into the first distribution annular chamber 17 are so arranged that they are offset relative to the inlets of the channels 20 into the first distribution annular chamber 17. The number of channels 21 amounts, in this case, preferably to 48 (stage 26).

Formed between the second distribution annular chamber 18 and the third distribution annular chamber 19 are channels 23 which preferably extend in spoke-shaped manner and whose inlets into the second distribution annular chamber 18 are offset relative to the channels 21 which are similarly open out here (stage 27).

Finally, the third central annular chamber 19 is connected to the outer annular chamber 16 by way of channels 28, the number of which in this case preferably amounts to 12. Whilst the channels 20, 21 and 23 have respectively an approximately constantly large cross-section, the cross-section of the channels 28 is smaller in dimension relative to these. This smaller dimensioning of the channels 28 as well as the number of the channels 28 which is reduced relative to the number of the channels 23 arranged in stage 27 represent altogether a reduction in the overall cross-section of the channels 20, 21 and 23 arranged in the stages 25, 26 and 27, and form, so to speak, a constricted outlet cross-section.

The inner annular chamber 15 is—in the event of the flow of the heating and/or cooling media being effected from the inside outwardly—connected to an inlet nipple 29, and the outer annular chamber 16 is connected to an outlet nipple 30.

The offset arrangement, mentioned in the foregoing, of the channels 20, 21 and 23 between the stages 25, 26 and 27 serves the purpose that the flow of a heating and/or cooling medium running through the channels 20, 21 and 23 is effected if possible in turbulences. In this way, more especially in the heating-up phase of the press mould, the heat transfer is improved. The droplets of condensate which form afresh again and again on the walls of the channel system are gradually detached from the walls by these turbulences and thus can no longer hinder the heat transfer.

Figure 5:
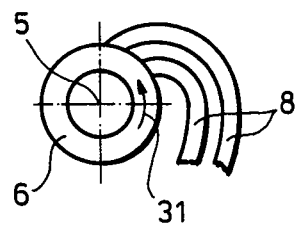
FIG. 5 shows a partial detail from FIG. 2, but partially altered relative thereto.
Figure 6:
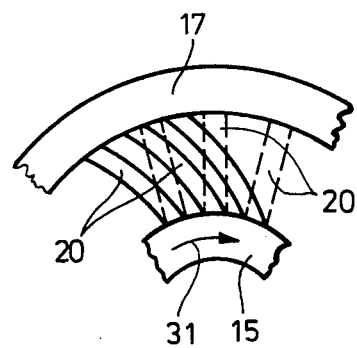
FIG. 6 shows a partial detail from FIG. 4 but partially altered relative thereto and on a larger scale.

It has proved to be expedient and advantageous to make the cross-section of the inlets (inflow collecting chambers 6, annular chamber 15 in FIGS. 5 and 6) at least twice as large in design as the overall inflow cross-section of the channels 8, 20; on the other hand, it is expedient to undertake the constrictions in the region of the outlets of the channels 8 in their sum for at least ⅓ of the cross-section of the outflow collecting chamber. As a result of this throttling, a uniform charging of the individual channels is brought about and thus a uniform temperature distribution.

A similar effect is achieved or strengthened if (FIG. 5 and FIG. 6) the channels 8 are angled off directly behind their inflows (inflow collecting chamber 6; annular chamber 15) contrary to the direction of flow (arrow 31) in the inflows, namely beyond 90°. Possibly in this way the cross-sectional ratio indicated further above can be reduced, without the uniformity of the temperature distribution thereby being impaired.

Figure 7:
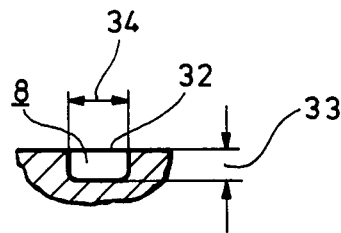
FIG. 7 shows a cross-section of a channel.

It is also of advantage to make the surface, facing the pressing part or the pressing composition and wetted by the cooling or heating agent, of the press mould half wider in design than the depth of the channels, i.e. to make the channels wider than deep (FIG. 7). The necessary capacity of the heat transfer from the medium, flowing in the channels, to the pressing part thereby becomes greater, i.e. the heat transfer is accelerated. The same effect is achieved if the cover plate 3, 13 of the press mould half is produced from Ni, Cu, Cu-beryllium, Cu-Ni, Cu-Zr, Cu-Zr-Ag or aluminium.

A good connection between the two parts of the press mould half 1, namely the cover plate 3 and the base plate 2, is most reliably ensured if it is effected by means of diffusion welding; in this respect there arises the additional effect that the heat transfer between the two parts of the press mould half and thus to the pressing part itself can be effected as continuously, uniformly and rapidly as in the case of a one-piece workpiece.

Figure 8:
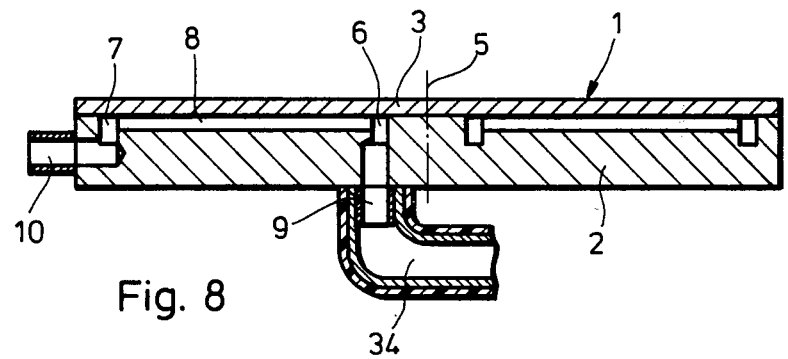
FIG. 8 shows a supplement to that which is shown in FIG. 1.

In the case of the known press moulds the supplying of the cooling or heating medium to the inflow collecting chamber 6 or inner annular chamber 15 is effected through the base plate 2 of the press mould half 1. The result of this that the part of the press mould half 1 (base plate 2) which contains this inlet is heated up more and thus the entire press mould half is heated-up in a non-uniform manner. This disadvantage can be avoided if the supply for the cooling or heating agent is left as long as possible outside the press mould half 1 and in so doing the supply pipe 34 (FIG. 8) is provided with a heat insulation as far as the inlet 9. A local overheating or non-uniform heating (or conversely: cooling) of the press mould half is avoided, whereby uniform temperature changes at the workpiece, in other words pressing part, are achieved. At the same time, in this way the press mould half can be made thinner and thus lighter in design; it therefore follows the temperature changes even more rapidly.

We claim:

1. A press mould half for producing records comprising a mould half having a pressing surface thereon and a channel system formed beneath said surface for conducting heating and cooling fluids in substantially uniform heat transfer relationship with said surface, said system including an inflow collecting chamber for collecting fluid flowing into said system and an outflow collecting chamber spaced apart from said inflow collecting chamber for collecting fluid flowing out of said system, and a plurality of channels each extending over given paths from said inflow collecting chamber to a region adjacent said outflow collecting chamber and in fluid communication with said chambers, the overall transverse cross section of said channels in said region adjacent said outflow collecting chamber being less than the smallest overall transverse cross section of said channels over said given paths.

2. A press mould half according to claim 1, further including a base plate beneath said pressing surface, said inflow and outflow collecting chambers having an annular form in said base plate and being arranged concentrically with respect to the center of said base plate.

3. A press mould half according to claims 1 or 2, wherein said channels are arranged to extend spirally over said given paths.

4. A press mould half according to claims 1 or 2, wherein said channels are arranged to extend in a spoke like manner over said given paths.

5. A press mould half according to claim 4, further including an annular distribution chamber formed between said inflow and outflow collecting chambers and arranged concentrically therewith.

6. A press mould half according to claim 5, wherein three annular distribution chambers are formed between said inflow and outflow collecting chambers.

7. A press mould half according to claim 6, wherein the number of said channels communicating with said annular distribution chambers in the direction of fluid flow is successively increased between adjacent ones of said distribution chambers thereby defining first, second and third stages of said channels, and the number of said channels communicating between the last distribution chamber in said fluid flow direction and said outflow collecting chamber is decreased from the number of channels in the third stage of said channels, thereby defining a final stage of said channels.

8. A press mould half according to claim 7, wherein said first stage consists of 24 channels, said second stage consists of 48 channels, said third stage consists of 96 channels, and said final stage consists of 12 channels, wherein the overall transverse cross section of the final stage of said channels is smaller than the smallest overall transverse cross section of the first, second and third stages of said channels.

9. A press mould half according to claim 6, wherein each of said first, second and third stages of channels are arranged in an offset manner relative to each other between said distribution chambers.

10. A press mould half according to claim 1, wherein each of said channels has a constriction in the region adjacent said outflow collecting chamber.

11. A press mould half according to claim 1, wherein the ratio of the transverse cross section of said inflow collecting chamber to the overall transverse cross section of those channels directly communicating with said inflow collecting chamber is at least 2:1, and the ratio of the transverse cross section of said outflow collecting chamber to the overall transverse cross section of said channels in the regions adjacent said outflow collecting chamber is at least 3:1.

12. A press mould half according to claim 1, wherein each of said channels is arranged to communicate with said inflow collecting chamber to define an angle of more than 90 degrees relative to the direction of fluid flow in said inflow collecting chamber.

13. A press mould half according to claim 1, wherein the width of each of said channels directly beneath said pressing surface is greater than the depth thereof relative to said pressing surface.

14. A press mould half according to claim 2, further including a cover plate joined to said base plate to define said pressing surface, said cover plate being formed of a material selected from the group comprising Ni, Cu, Cu-beryllium, Cu-Ni, Cu-Zr, Cu-Zr-AG or aluminum.

15. A press mould half according to claim 14, wherein said cover plate and said base plate are joined together by diffusion welding.

16. A press mould half according to claim 1, further including a heat insulated pipe coupled to said inflow collecting chamber for communicating the fluid flowing into said channel system thereto.

* * * * *